US006999446B2

(12) United States Patent
Hall et al.

(10) Patent No.: US 6,999,446 B2
(45) Date of Patent: Feb. 14, 2006

(54) ADAPTIVE, MULTI-RATE WAVEFORM AND FRAME STRUCTURE FOR A SYNCHRONOUS, DS-CDMA SYSTEM

(75) Inventors: Eric K. Hall, Sandy, UT (US); Thomas R. Giallorenzi, Riverton, UT (US); Richard B. Ertel, Sandy, UT (US); Lee A. Butterfield, West Jordan, UT (US); Dan M. Griffin, Bountiful, UT (US); Philip L. Stephenson, Salt Lake City, UT (US)

(73) Assignee: L-3 Communications Corporation, New York, NY (US)

( * ) Notice: Subject to any disclaimer, the term of this patent is extended or adjusted under 35 U.S.C. 154(b) by 1001 days.

(21) Appl. No.: 10/039,514

(22) Filed: Oct. 26, 2001

(65) Prior Publication Data

US 2002/0126650 A1 Sep. 12, 2002

Related U.S. Application Data

(60) Provisional application No. 60/243,808, filed on Oct. 27, 2000.

(51) Int. Cl.
*H04J 3/24* (2006.01)

(52) U.S. Cl. ....................................... 370/349; 370/350

(58) Field of Classification Search ................ 370/320, 370/335, 342, 349, 350, 389, 441, 471, 479, 370/503, 506, 507, 510, 512, 514
See application file for complete search history.

(56) References Cited

U.S. PATENT DOCUMENTS 5,966,373 A 10/1999 Stephenson et al. ........ 370/335
6,424,689 B1 * 7/2002 Abe ........................... 375/366

* cited by examiner

*Primary Examiner*—Brenda Pham
(74) *Attorney, Agent, or Firm*—Harrington & Smith, LLP

(57) ABSTRACT

A method is disclosed for operating a wireless communications system, such as a DS-CDMA communications system, by transmitting a waveform that includes a plurality of repeating frames each having x header training base symbols in a header training symbol field (TH) and y tail training base symbols in a tail training symbol field (TT). The frame is received and functions as one of a plurality of different types of frames depending on the content of at least TT. In the preferred embodiment the frame functions as one of a normal traffic frame, a termination frame, or a legacy frame providing backwards compatibility with another waveform. A given one of the frames includes four equal-size data fields separated by three equal-sized control fields, the header training symbol field (TH) and the tail training symbol field (TT).

28 Claims, 12 Drawing Sheets

PHYSICAL LAYER FRAME FORMAT DETAILS FOR QPSK AND 16–QAM

| FRAME FORMAT FOR 4–QAM MODULATION | | | | | | | | | | |
|---|---|---|---|---|---|---|---|---|---|---|
| PAYLOAD BIT RATE (kbps) | AGGREGATE BIT RATE (kbps) | CODED SYMBOL RATE (ksps) | INFORMATION BYTES PER FRAME | | | | TRANSMITTED SYMBOLS PER FRAME | | | |
| | | | TOTAL | TRAINING | CONTROL | DATA | TOTAL | TRAINING | CONTROL | DATA |
| 32 | 34 | 21.25 | 68 | 1 | 3 | 64 | 340 | 5 | 15 | 320 |
| 64 | 68 | 42.5 | 136 | 2 | 6 | 128 | 680 | 10 | 30 | 640 |
| 128 | 136 | 85 | 272 | 4 | 12 | 256 | 1360 | 20 | 60 | 1280 |
| 256 | 272 | 170 | 544 | 8 | 24 | 512 | 2720 | 40 | 120 | 2560 |
| 4096 | 4352 | 2720 | 8704 | 128 | 384 | 8192 | 43520 | 640 | 1920 | 40960 |
| FRAME FORMAT FOR 16–QAM MODULATION | | | | | | | | | | |
| PAYLOAD BIT RATE (kbps) | AGGREGATE BIT RATE (kbps) | CODED SYMBOL RATE (ksps) | INFORMATION BYTES PER FRAME | | | | TRANSMITTED SYMBOLS PER FRAME | | | |
| | | | TOTAL | TRAINING | CONTROL | DATA | TOTAL | TRAINING | CONTROL | DATA |
| 64 | 68 | 21.25 | 136 | 2 | 6 | 128 | 340 | 5 | 15 | 320 |
| 128 | 136 | 42.5 | 272 | 4 | 12 | 256 | 680 | 10 | 30 | 640 |
| 256 | 272 | 85 | 544 | 8 | 24 | 512 | 1360 | 20 | 60 | 1280 |
| 512 | 544 | 170 | 1088 | 16 | 48 | 1024 | 2720 | 40 | 120 | 2560 |
| 8192 | 8704 | 2720 | 17408 | 256 | 768 | 16384 | 43520 | 640 | 1920 | 40960 |

| SYMBOL RATE | HEADER–TRAINING SYMBOLS | HEADER–TRAINING FIELD (TH) | TAIL–TRAINING SYMBOLS | TAIL–TRAINING FIELD (TT) |
|---|---|---|---|---|
| 21.25 ksps | 2 | h | 3 | t |
| 42.5 ksps | 4 | hh | 6 | tt |
| 85 ksps | 8 | hhhh | 12 | tttt |
| 170 ksps | 16 | hhhhhhhh | 24 | tttttttt |
| 2720 ksps | 256 | h x 128 | 384 | t x 128 |

NORMAL FRAME FORMAT STREAM

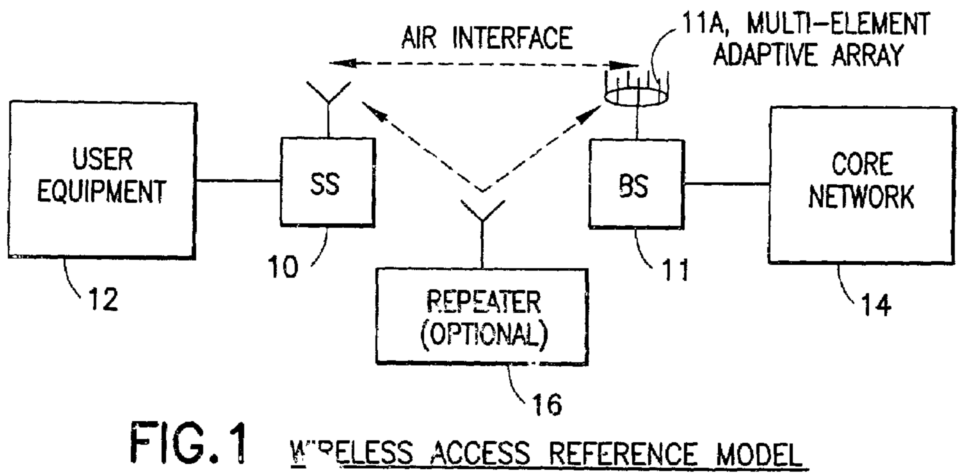
FIG. 1 WIRELESS ACCESS REFERENCE MODEL
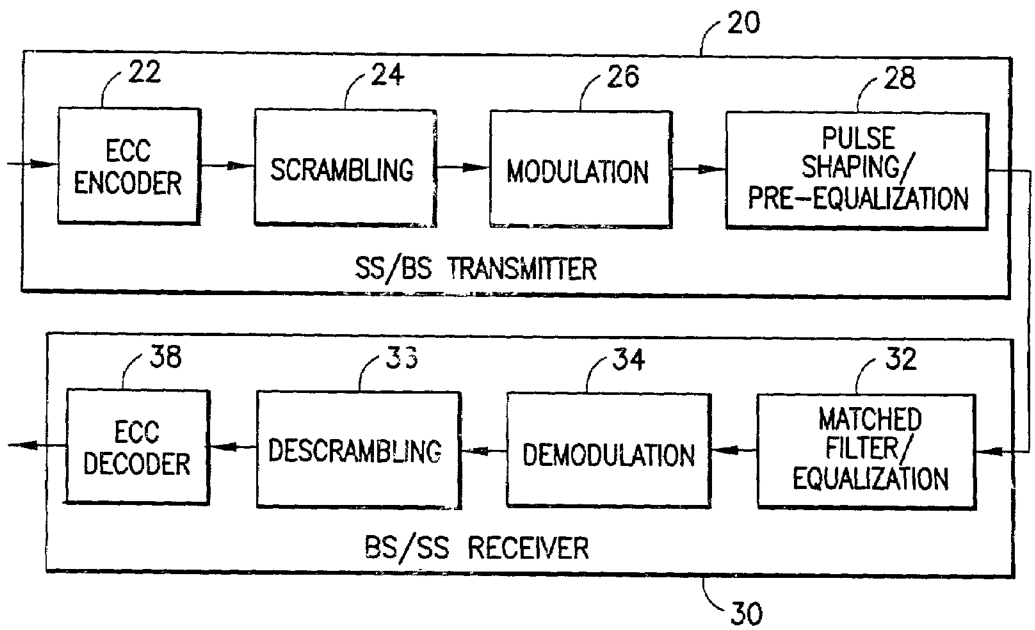
FIG. 2 PHY REFERENCE MODEL SHOWING DATA FLOW
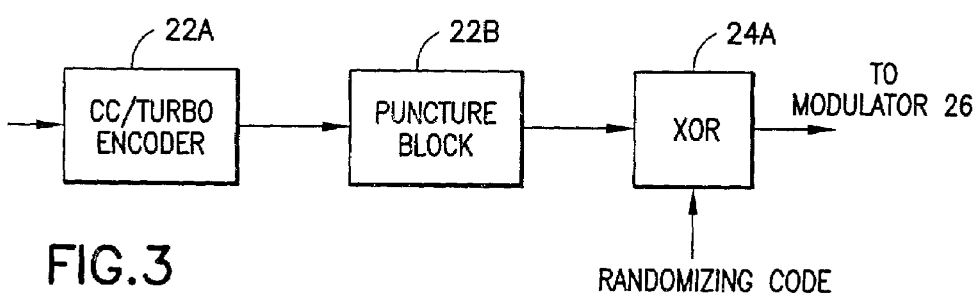
FIG. 3

| | MODULATION AND CHANNEL CODING | | |
|---|---|---|---|
| PARAMETER | QPSK w/R=4/5 CODING (1.6 BITS/SYM) | 16-QAM w/R=4/5 CODING (3.2 BITS/SYM) | 64-QAM w/R=4/5 CODING (4.8 BITS/SYM) |
| RF CHANNEL BANDWIDTH | 3.5 MHz | 3.5 MHz | 3.5 MHz |
| CHIP RATE | 2.56 Mcps | 2.56 Mcps | 2.56 Mcps |
| COMMUNICATION CHANNEL BANDWIDTH | 4.096 Mbps | 8.192 Mbps | 12.288 Mbps |
| PEAK DATA RATE | 4.096 Mbps | 8.192 Mbps | 12.288 Mbps |
| CDMA CHANNEL BANDWIDTH (SF=1) | 4.096 Mbps | 8.192 Mbps | 12.288 Mbps |
| CDMA CHANNEL BANDWIDTH (SF=16) | 256 kbps | 512 kbps | 768 kbps |
| CDMA CHANNEL BANDWIDTH (SF=128) | 32 kbps | 64 kbps | 96 kbps |
| MODULATION FACTOR | 1.17 bps/Hz | 2.34 bps/Hz | 3.511 bps/Hz |

FIG.4 HYPOTHETICAL PARAMETERS FOR A 3.5 MHz RF CHANNELIZATION

| | QPSK | | 16 QAM | | 64 QAM | |
|---|---|---|---|---|---|---|
| NUMBER OF ELEMENTS | AGGREGATE CAPACITY (Mbps) | MODULATION FACTOR | AGGREGATE CAPACITY (Mbps) | MODULATION FACTOR | AGGREGATE CAPACITY (Mbps) | MODULATION FACTOR |
| 1 | 4.096 | 1.17 | 8.192 | 2.34 | 12.288 | 3.511 |
| 2 | 8.192 | 2.34 | 16.384 | 4.68 | 24.576 | 7.022 |
| 4 | 16.384 | 4.68 | 32.768 | 9.36 | 49.152 | 14.044 |
| 8 | 32.768 | 9.36 | 65.536 | 18.72 | 98.304 | 28.088 |
| 16 | 65.536 | 18.72 | 131.072 | 37.44 | 196.608 | 56.176 |

FIG.5 AGGREGATE CAPACITY AND MODULATION FACTORS VERSUS MODULATION TYPE AND ARRAY SIZE

PHYSICAL LAYER FRAME FORMAT DETAILS FOR QPSK AND 16-QAM

| FRAME FORMAT FOR 4-QAM MODULATION | | | | | | | | | | |
|---|---|---|---|---|---|---|---|---|---|---|
| PAYLOAD BIT RATE (kbps) | AGGREGATE BIT RATE (kbps) | CODED SYMBOL RATE (ksps) | INFORMATION BYTES PER FRAME | | | | TRANSMITTED SYMBOLS PER FRAME | | | |
| | | | TOTAL | TRAINING | CONTROL | DATA | TOTAL | TRAINING | CONTROL | DATA |
| 32 | 34 | 21.25 | 68 | 1 | 3 | 64 | 340 | 5 | 15 | 320 |
| 64 | 68 | 42.5 | 136 | 2 | 6 | 128 | 680 | 10 | 30 | 640 |
| 128 | 136 | 85 | 272 | 4 | 12 | 256 | 1360 | 20 | 60 | 1280 |
| 256 | 272 | 170 | 544 | 8 | 24 | 512 | 2720 | 40 | 120 | 2560 |
| 4096 | 4352 | 2720 | 8704 | 128 | 384 | 8192 | 43520 | 640 | 1920 | 40960 |
| FRAME FORMAT FOR 16-QAM MODULATION | | | | | | | | | | |
| PAYLOAD BIT RATE (kbps) | AGGREGATE BIT RATE (kbps) | CODED SYMBOL RATE (ksps) | INFORMATION BYTES PER FRAME | | | | TRANSMITTED SYMBOLS PER FRAME | | | |
| | | | TOTAL | TRAINING | CONTROL | DATA | TOTAL | TRAINING | CONTROL | DATA |
| 64 | 68 | 21.25 | 136 | 2 | 6 | 128 | 340 | 5 | 15 | 320 |
| 128 | 136 | 42.5 | 272 | 4 | 12 | 256 | 680 | 10 | 30 | 640 |
| 256 | 272 | 85 | 544 | 8 | 24 | 512 | 1360 | 20 | 60 | 1280 |
| 512 | 544 | 170 | 1088 | 16 | 48 | 1024 | 2720 | 40 | 120 | 2560 |
| 8192 | 8704 | 2720 | 17408 | 256 | 768 | 16384 | 43520 | 640 | 1920 | 40960 |

FIG.8A

| SYMBOL RATE | HEADER–TRAINING SYMBOLS | HEADER–TRAINING FIELD (TH) | TAIL–TRAINING SYMBOLS | TAIL–TRAINING FIELD (TT) |
|---|---|---|---|---|
| 21.25 ksps | 2 | h | 3 | t |
| 42.5 ksps | 4 | hh | 6 | tt |
| 85 ksps | 8 | hhhh | 12 | tttt |
| 170 ksps | 16 | hhhhhhhh | 24 | tttttttt |
| 2720 ksps | 256 | h x 128 | 384 | t x 128 |

FIG.8B

| SYMBOL RATE | HEADER–TRAINING SYMBOLS | HEADER–TRAINING FIELD (TH) | TAIL–TRAINING SYMBOLS | TAIL–TRAINING FIELD (TT) |
|---|---|---|---|---|
| 21.25 ksps | 2 | h | 3 | v |
| 42.5 ksps | 4 | hh | 6 | vv |
| 85 ksps | 8 | hhhh | 12 | vvtt |
| 170 ksps | 16 | hhhhhhhh | 24 | vvtttttt |
| 2720 ksps | 256 | hh.............h | 384 | vvttt.........t |

FIG.8C $$\left.\begin{aligned} I &= A\cdot[2d_1-1] \\ Q &= A\cdot[2d_0-1] \end{aligned}\right\}$$
FIG. 10A
$$\left.\begin{aligned} I &= A\cdot[2d_3-1] \quad \begin{cases} A & d_1 = 0 \\ 3A & d_1 = 1 \end{cases} \\ Q &= A\cdot[2d_2-1] \quad \begin{cases} A & d_0 = 0 \\ 3A & d_0 = 1 \end{cases} \end{aligned}\right\}$$
FIG. 10B
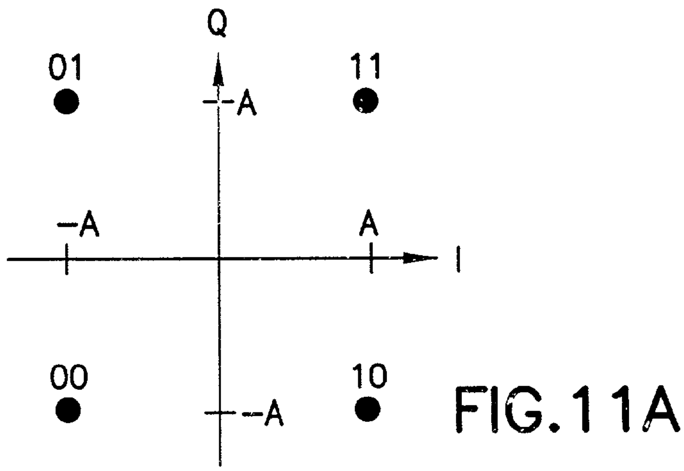
FIG. 11A
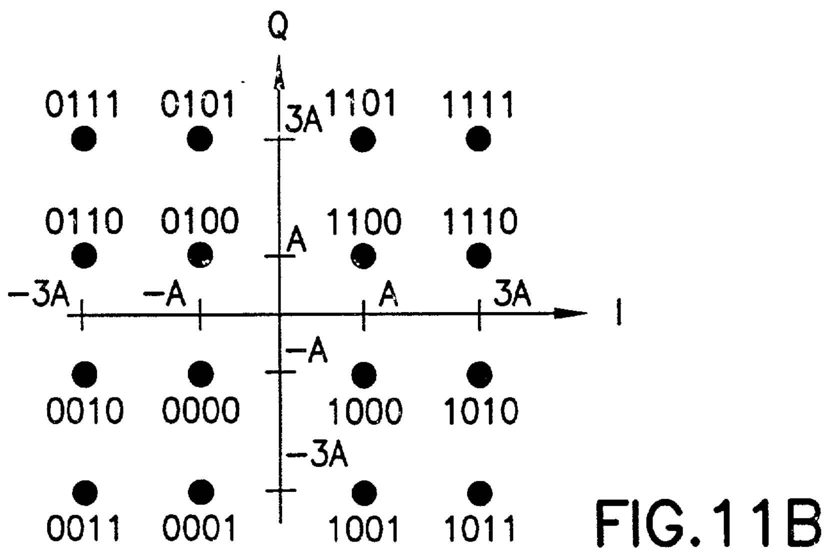
FIG. 11B

| SYMBOL RATE | 4-QAM | 16-QAM |
|---|---|---|
| | SPACING PARAMETER (A) | SPACING PARAMETER (A) |
| 21.25 ksps | $A_0$ | $A_0 \cdot \sqrt{2/5}$ |
| 42.5 ksps | $A_0 \cdot \sqrt{2}$ | $A_0 \cdot 2\sqrt{1/5}$ |
| 85 ksps | $A_0 \cdot 2$ | $A_0 \cdot 2\sqrt{2/5}$ |
| 170 ksps | $A_0 \cdot 2\sqrt{2}$ | $A_0 \cdot 4\sqrt{1/5}$ |
| 2720 ksps | $A_0 \cdot 8\sqrt{2}$ | $A_0 \cdot 16\sqrt{1/5}$ |

FIG. 12A

| SYMBOL RATE | 4-QAM | 16-QAM |
|---|---|---|
| | SPACING PARAMETER (A) | SPACING PARAMETER (A) |
| 21.25 ksps | $A_0$ | $A_0 \cdot \sqrt{1/5}$ |
| 42.5 ksps | $A_0 \cdot \sqrt{2}$ | $A_0 \cdot \sqrt{2/5}$ |
| 85 ksps | $A_0 \cdot 2$ | $A_0 \cdot 2\sqrt{1/5}$ |
| 170 ksps | $A_0 \cdot 2\sqrt{2}$ | $A_0 \cdot 2\sqrt{2/5}$ |
| 2720 ksps | $A_0 \cdot 8\sqrt{2}$ | $A_0 \cdot 8\sqrt{2/5}$ |

FIG. 12B

| SYMBOL RATE (ksps) | SPREAD FACTOR (CHIPS/SYMBOL) |
|---|---|
| 21.25 | 128 |
| 42.5 | 64 |
| 85 | 32 |
| 170 | 16 |
| 2720 | 1 |

FIG. 13

| MODULATION FORMAT | REQUIRED $E_b/N_0$ IN dB | |
|---|---|---|
| | $BER=10^{-6}$ | $BER=10^{-9}$ |
| 4-QAM | 6.1 dB | ~8.5 dB |
| 16-QAM | 9.6 dB | ~11.5 dB |

FIG. 19

| | | | | | | | | | | | |
|---|---|---|---|---|---|---|---|---|---|---|---|
| $a_1$ | $s_0(0)$ | $s_0(1)$ | $s_0(3)$ | $s_0(4)$ | $s_0(6)$ | $s_0(8)$ | $s_0(9)$ | $s_0(11)$ | $s_0(12)$ | $s_0(14)$ | . . . |
| $a_0$ | $s_1(0)$ | $s_0(2)$ | $s_1(4)$ | $s_0(5)$ | $s_0(7)$ | $s_1(8)$ | $s_0(10)$ | $s_1(12)$ | $s_0(13)$ | $s_0(15)$ | . . . |

| | | | | |
|---|---|---|---|---|
| $d_3$ | $a_1(0)$ | $a_1(2)$ | $a_1(4)$ | . . . |
| $d_2$ | $a_0(0)$ | $a_0(2)$ | $a_0(4)$ | . . . |
| $d_1$ | $a_1(1)$ | $a_1(3)$ | $a_1(5)$ | . . . |
| $d_0$ | $a_0(1)$ | $a_0(3)$ | $a_0(5)$ | . . . |

ADAPTIVE, MULTI-RATE WAVEFORM AND FRAME STRUCTURE FOR A SYNCHRONOUS, DS-CDMA SYSTEM

CLAIM OF PRIORITY FROM COPENDING PROVISIONAL PATENT APPLICATION

This patent application claims priority from U.S. Provisional Patent Application No. 60/243,808, filed on Oct. 27, 2000, the disclosure of which is incorporated by reference herein in its entirety.

FIELD OF THE INVENTION

These teachings relate generally to wireless communications systems and methods, and relate in particular to a waveform for use in a Synchronous Code Division Multiple Access (S-CDMA) system.

BACKGROUND OF THE INVENTION

In a synchronous direct-sequence code division multiple access (S-CDMA) system, users communicate simultaneously using the same frequency band via orthogonal modulation or spread spectrum.

Reference with regard to a CDMA waveform can be made to P. Stephenson, T. Giallorenzi, J. Harris, L. Butterfield, M. Hurst, D. Griffin and R. Thompson, U.S. Pat. No. 5,966,373, Waveform And Frame Structure For A Fixed Wireless Loop Synchronous CDMA Communications System, issued Oct. 12, 1999.

This commonly assigned U.S. Patent discloses a method and a system for transmitting information in a CDMA communication system. In the method there are steps of (a) multiplexing data and control information into a data stream; (b) encoding the data stream to form a stream of encoded I/Q symbol pairs; (c) inserting synchronization information into the stream of encoded I/Q symbol pairs; and (d) spreading the encoded I/Q symbol pairs and the inserted synchronization information using a same pseudonoise (PN) spreading code prior to transmission as a frame. The multiplexing step forms a data stream having data fields composed of a plurality of data bytes separated by control message fields. Each of the control message fields is a single byte of a control message frame. The control message frame includes a control message header field, a number of control data fields, and a plurality of data integrity fields.

More particularly, the frame includes an unencoded synchronization field followed by a plurality of data fields that each contain the data bytes. Individual ones of the data fields are separated by one of the control message fields, that in turn are composed of a single byte of the multi-byte control message frame.

The encoder operates to rate 1/2 convolutionally encode the data stream to form an I channel and a Q channel; and to then rate 4/5 puncture trellis code the I and Q channels.

While well suited for its intended purpose, advances and recent developments and requirements in the field of CDMA communication have brought about the need for an improved CDMA waveform. This need is met by the CDMA waveform in accordance with the teachings of this invention, as described in detail below.

SUMMARY OF THE INVENTION

In accordance with an aspect of these teachings there is described a method for transmitting information in a synchronous, orthogonal DS-CDMA communications system. The method is optimized for fixed wireless access systems and enables efficient support of both circuit-switched services, including voice and streamed-audio and video, as well as packet-switched services such as Internet access and data networking. The method and system provide a waveform that is symmetric in the forward link and in the reverse link, i.e., the waveform can be identical where going from a base station to a subscriber station or from the subscriber station to the base station. The waveform preferably operates with frequency division duplexing. The waveform uses multi-carrier transmission, and supports up to four carriers with aggregation between carriers. That is, a given user's data can be conveyed simultaneously by more than one carrier. On each carrier, the presently preferred DS-CDMA waveform uses a fixed chip rate of 2.72 Mcps and variable-length, orthogonal spreading codes. The spreading codes are constructed from randomized Walsh-Hadamard designs and spread factors of 1, 2, 4, 8, 16, 32, 64 and 128 chips/symbol are supported. The waveform supports, for example, QPSK, 16-QAM and 64-QAM modulation formats with convolutional coding, such as rate 4/5 convolutional coding. Nyquist pulse shaping is used for spectral containment, with a nominal occupied bandwidth of 3.5 MHz per carrier. Each CDMA channel is time-slotted with 16 ms slot durations, also referred to herein as a frame, and has some fixed percentage of control, synchronization and data symbols per slot. The waveform supports multi-rate CDMA channels, with the rate determined by the modulation format and the spreading factor. Considering the overhead in the channel coding and frame structure, with rate 4/5 coding, the waveform supports payload data rates of 32, 64, 128, 256, 512, 1024, 2048, 4096 and 8192 kbps per CDMA channel using the above-mentioned modulation. Aggregation of CDMA channels and carriers is used to support payload data rates of the form n×32 kbps up to 32.768 Mbps in both the forward and reverse links, or 49.152 Mbps when using 64-QAM.

The presently preferred CDMA waveform is adaptable to operate in one of a (i) normal mode, (ii) a CDMA channel termination mode, or (iii) a legacy mode of operation, wherein in the legacy mode of operation the waveform is compatible with earlier (legacy) waveforms, such as the waveform described in the above referenced U.S. Pat. No. 5,966,373.

A method is disclosed for operating a wireless communications system, such as a DS-CDMA communications system, by transmitting a waveform that includes a plurality of repeating frames each having x header training base symbols in a header training symbol field (TH) and y tail training base symbols in a tail training symbol field (TT). The frame is received and functions as one of a plurality of different types of frames depending on the content of at least TT. In the preferred embodiment the frame functions as one of a normal traffic frame, a termination frame, or a legacy frame providing backwards compatibility with another waveform. A given one of the frames includes four equal-size data fields separated by three equal-sized control fields, the header training symbol field (TH) and the tail training symbol field (TT).

BRIEF DESCRIPTION OF THE DRAWINGS

The above set forth and other features of these teachings are made more apparent in the ensuing Detailed Description of the Preferred Embodiments when read in conjunction with the attached Drawings, wherein:

FIG. 1 is simplified block diagram of a wireless access reference model that pertains to these teachings;

FIG. 2 is block diagram of a physical (PHY) system reference model showing a major data flow path;

FIG. 3 shows an Error Control Coding (ECC) and scrambling technique for single CDMA channel;

FIG. 4 is a Table illustrating exemplary parameters for a 3.5 MHz RF channelization;

FIG. 5 is a Table depicting an aggregate capacity and modulation factors versus modulation type and antenna array size (number of elements);

FIG. 8A illustrates a Table showing the physical layer frame format details for QPSK and 16-QAM modulation formats;

FIG. 8B illustrates a Table showing Header and Tail training fields for a normal frame format;

FIG. 8C is a Table showing Header and Tail training fields for a termination frame format;

FIGS. 10A and 10B illustrate synthesis equations for a 4-QAM and a 16-QAM constellation mapping, respectively;

FIGS. 11A and 11B show 4-QAM and 16-QAM bit-to-symbol mapping, respectively;

FIG. 12A is a Table that specifies constellation spacing parameters for 4-QAM and 16-QAM modulation with equal energy per information bit;

FIG. 12B is a Table that specifies constellation spacing parameters for 4-QAM and 16-QAM modulation with equal energy per symbol;

FIG. 13 is a Table that illustrates CDMA channel symbol rates and corresponding spread factors;

FIG. 14A is a circuit diagram that illustrates heterodyne spreading, while

FIG. 19 is a Table showing a minimum Eb/No for different BER and modulation formats.

DETAILED DESCRIPTION OF THE PREFERRED EMBODIMENTS

Figure 6A:
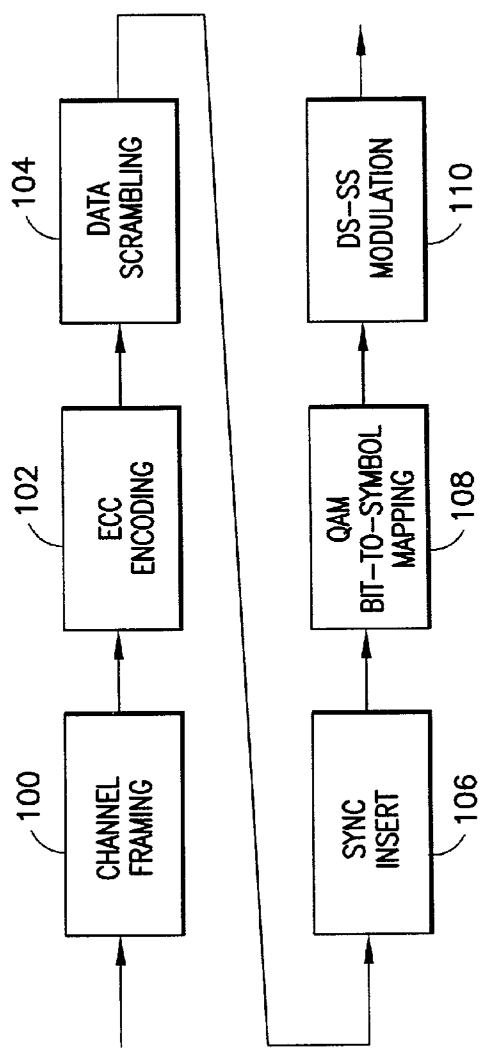
FIG. 6A is a block diagram of a CDMA channel baseband transmit chain.

Disclosed herein is a physical (PHY) system intended for IEEE 802.16 and related standards, although those having skill in the art should realize that various aspects of these teachings have wider applicability. The disclosed system is but one suitable embodiment for practicing the teachings of this invention.

The PHY technique is based on a hybrid synchronous DS-CDMA (S-CDMA) and FDMA scheme using quadrature amplitude modulation (QAM) and trellis coding. For a general background and benefits of S-CDMA with trellis-coded QAM one may refer to R. De Gaudenzi, C. Elia and R. Viola, Bandlimited Quasi-Synchronous CDMA: A Novel Satellite Access Technique for Mobile and Personal Communication Systems, IEEE Journal on Selected Areas in Communications, Vol. 10, No. 2, February 1992, pp. 328–343, and to R. De Gaudenzi and F. Gianneti, Analysis and Performance Evaluation of Synchronous Trellis-Coded CDMA for Satellite Applications, IEEE Transactions on Communications, Vol. 43, No. 2/3/4, February/March/April 1995, pp. 1400–1409.

The ensuing description focuses on a frequency division duplexing (FDD) mode. While a time division duplexing (TDD) mode is also within the scope of these teachings, the TDD mode is not discussed further.

What follows is an overview of the PHY teachings which will be useful in gaining a fuller understanding of the teachings of this invention.

The system provides synchronous direct-sequence code division multiple access (DS-CDMA) for both upstream and downstream transmissions. The system further provides spread RF channel bandwidths from 1.75–7 MHz, depending on target frequency band, and a constant chip rate from 1–6 Mcps (Million chips per second) within each RF sub-channel with common I-Q spreading. The chip rate depends on channelization of interest (e.g. 3.5 MHz or 6 MHz). The system features orthogonal, variable-length spreading codes using Walsh-Hadamard designs with spread factors (SF) of 1, 2, 4, 8, 16, 32, 64 and 128 chips/symbol being supported, and also features unique spreading code sets for adjacent, same-frequency cells/sectors. Upstream and downstream power control and upstream link timing control are provided, as are single CDMA channel data rates from 32 kbps up to 16 Mbps depending on SF (spreading factor) and chip rate. In the preferred system S-CDMA channel aggregation is provided for the highest data rates.

Furthermore, in the presently preferred embodiment FDMA is employed for large bandwidth allocations with S-CDMA in each FDMA sub-channel, and S-CDMA/FDMA channel aggregation is used for the higher data rates. Code, frequency and/or time division multiplexing is employed for both upstream and downstream transmissions. Frequency division duplex (FDD) or time division duplex (TDD) can be employed, although as stated above the TDD mode of operation is not described further. The system features coherent QPSK and 16-QAM modulation with optional support for 64-QAM. End-to-end raised-cosine Nyquist pulse shape filtering is employed, as is adaptive coding, using high-rate punctured, convolutional coding (K=7) and/or Turbo coding (rates of 4/5, 5/6 and 7/8 are typical). Data randomization using spreading code sequences is employed, as is linear equalization in the downstream with possible transmit pre-equalization for the upstream.

As will be described more fully below, also featured is the use of space division multiple access (SDMA) using adaptive beam-forming antenna arrays (e.g., 1 to 16 elements) at the base station.

FIG. 1 shows the wireless access reference model per the IEEE 802.16 FRD (see IEEE 802.16.3-00/02r4, Functional Requirements for the 802.16.3 Interoperability Standard.). Within this model, the PHY technique in accordance with these teachings provides access between one or more subscriber stations (SS) 10, also referred to herein simply as users, and base stations (BS) 11 to support the user equipment 12 and core network 14 interface requirements. An optional repeater 16 may be deployed. In the preferred embodiment the BS 11 includes a multi-element adaptive array antenna 11A, as will be described in detail below. The BS 11 may also be referred to herein as a Radio Base Unit (RBU).

In FIG. 2, the PHY reference model is shown. This reference model is useful in discussing the various aspects of the PHY technique. As is apparent, the SS 10 and BS transmission and reception equipment may be symmetrical. In a transmitter 20 of the BS 11 or the SS 10 there is an Error Control Coding (ECC) encoder 22 for incoming data, followed by a scrambling block 24, a modulation block 26 and a pulse shaping/pre-equalization block 28. In a receiver 30 of the BS 11 or the SS 10 there is a matched filter/equalization block 32, a demodulation block 34, a descrambling block 36 and an ECC decoder 38. These various components are discussed in further detail below.

The PHY interfaces with the Media Access Control (MAC) layer, carrying MAC packets and enabling MAC functions based on Quality of Service (QoS) requirements and Service Level Agreements (SLAs). As a S-CDMA system, the PHY interacts with the MAC for purposes of power and timing control. Both power and timing control originate from the BS 11, with feedback from the SS 10 needed for forward link power control. The PHY also interacts with the MAC for link adaptation (e.g. bandwidth allocation and SLAs), allowing adaptation of modulation formats, coding, data multiplexing, etc.

With regard to frequency bands and RF channel bandwidths, the primary frequency bands of interest for the PHY include the ETSI frequency bands from 1–3 GHz and 3–11 GHz as described in ETSI EN 301 055, Fixed Radio Systems; Point-to-multipoint equipment; Direct Sequence Code Division Multiple Access (DS-CDMA); Point-to-point digital radio in frequency bands in the range 1 GHz to 3 GHz, and in ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz, as well as with the MMDS/MDS (digital TV) frequency bands. In ETSI EN 301 124, the radio specifications for DS-CDMA systems in the fixed frequency bands around 1.5, 2.2, 2.4 and 2.6 GHz are given, allowing channelizations of 3.5, 7, 10.5 and 14 MHz. Here, the Frequency Division Duplex (FDD) separation is specific to the center frequency and ranges from 54 to 175 MHz. In ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz., the radio characteristics of DS-CDMA systems with fixed frequency bands centered around 3.5, 3.7 and 10.2 GHz are specified, allowing channelizations of 3.5, 7, 14, 5, 10 and 15 MHz. Here, FDD separation is frequency band dependant and ranges from 50 to 200 MHz. Also of interest to these teachings are the MMDS/ITSF frequency bands between 2.5 and 2.7 GHz with 6 MHz channelizations.

With regard to multiple access, duplexing and multiplexing, the teachings herein provide a frequency division duplex (FDD) PHY using a hybrid S-CDMA/FDMA multiple access scheme with SDMA for increased spectral efficiency. In this approach, a FDMA sub-channel has an RF channel bandwidth from 1.75 to 7 MHz. The choice of FDMA sub-channel RF channel bandwidth is dependent on the frequency band of interest, with 3.5 MHz and 6 MHz being typical per the IEEE 802.16 FRD. Within each FDMA sub-channel, S-CDMA is used with those users transmitting in the upstream and downstream using a constant chipping rate from 1 to 6 Mchips/second. While TDD could be used in a single RF sub-channel, this discussion is focused on the FDD mode of operation. Here, FDMA sub-channel(s) are used in the downstream while at least one FDMA sub-channel is required for the upstream. The approach is flexible to asymmetric data traffic, allowing more downstream FDMA sub-channels than upstream FDMA sub-channels when traffic patterns and frequency allocation warrant. Based on existing frequency bands, typical upstream/downstream FDMA channel separation range from 50 to 200 MHz.

Turning now to the Synchronous DS-CDMA (S-DS/CDMA) aspects of these teachings, within each FDMA sub-channel, S-CDMA is used in both the upstream and the downstream directions. The chipping rate is constant for all SS with rates ranging from 1 to 6 Mchips/second depending on the FDMA RF channel bandwidth. Common I-Q spreading is performed using orthogonal, variable-length spreading codes based on Walsh-Hadamard designs, with spread factors ranging from 1 up to 128 chips per symbol (see, for example, E. Dinan and G. Jabbari, Spreading Codes for Direct Sequence CDMA and Wideband CDMA Cellular Networks, IEEE Communications Magazine, September 1998, pp. 48–54. For multi-cell deployments with low frequency reuse, unique spreading code sets are used in adjacent cells to minimize interference.

An aspect of the preferred system embodiment is a symmetric waveform within each FDMA sub-channel, where both the upstream and downstream utilize the same chipping rate (and RF channel bandwidth), spreading code sets, modulation, channel coding, pulse shape filtering, etc.

Referring now to Code and Time Division Multiplexing and channel aggregation, with a hybrid S-CDMA/FDMA system it is possible to multiplex data over codes and frequency sub-channels. Furthermore, for a given code or frequency channel, time division multiplexing could also be employed. In the preferred approach, the following multiplexing scheme is employed.

For the downstream transmission with a single FDMA sub-channel, the channel bandwidth (i.e. capacity measured in bits/second) is partitioned into a single TDM pipe and multiple CDM pipes. The TDM pipe may be created via the aggregation of multiple S-CDMA channels. The purpose of this partition is based on the desire to provide Quality of Service (QoS). Within the bandwidth partition, the TDM pipe would be used for best effort service (BES) and for some assured forwarding (AF) traffic. The CDM channels would be used for expedited forwarding (EF) services, such as VoIP connections or other stream applications, where the data rate of the CDM channel is matched to the bandwidth requirement of the service.

The downlink could be configured as a single TDM pipe. In this case a time slot assignment may be employed for bandwidth reservation, with typical slot sizes ranging from 4–16 ms in length. While a pure TDM downlink is possible in this approach, it is preferred instead to employ a mixed TDM/CDM approach. This is so because long packets can induce jitter into EF services in a pure TDM link. Having CDMA channels (single or aggregated) dedicated to a single EF service (or user) reduces jitter without the need for packet fragmentation and reassembly. Furthermore, these essentially circuit-switched CDM channels would enable better support of legacy circuit-switched voice communications equipment and public switched telephone networks.

For the upstream, the preferred embodiment employs a similar partition of TDM/CDM channels. The TDM channel (s) are used for random access, using a slotted-Aloha protocol. In keeping with a symmetric waveform, recommended burst lengths are on the order of the slot times for the downlink, ranging from 4–16 ms. Multi-slot bursts are possible. The BS 11 monitors bursts from the SS 10 and allocates CDMA channels to SSs upon recognition of impending bandwidth requirements or based on service level agreements (SLAs). As an example, a BS 11 recognizing the initiation of a VoIP connection could move the transmission to a dedicated CDMA channel with a channel bandwidth of 32 kbps.

When multiple FDMA sub-channels are present in the upstream or downstream directions, similar partitioning could be used. Here, additional bandwidth exists which implies that more channel aggregation is possible. With a single TDM channel, data may be multiplexed across CDMA codes and across frequency sub-channels.

With regard now to Space Division Multiple Access (SDMA) extensions, a further aspect of this multiple access scheme involves the use of SDMA using adaptive beamforming antennas. Reference can be made to J. Liberti and T. Rappaport, *Smart Antennas for Wireless CDMA*, Prentice-Hall PTR, Upper Saddle River, N.J., 1997, for details of beamforming with CDMA systems.

In the preferred embodiment the adaptive antenna array 11A at the BS 11 is provided with fixed beam SS antennas. In this approach the S-CDMA/FDMA channels can be directed at individual SSs. The isolation provided by the beamforming allows the CDMA spreading codes to be reused within the same cell, greatly increasing spectral efficiency. Beamforming is best suited to CDM rather than TDM channels. In the downstream, TDM would employ beamforming on a per slot or burst basis, increasing complexity. In the upstream, beamforming would be difficult since the BS 11 would need to anticipate transmission from the SS in order to form the beams appropriately. In either case, reuse of CDMA spreading codes in a TDM-only environment would be difficult. With CDM, however, the BS 11 may allocate bandwidth (i.e. CDMA channels) to the SS 10 based on need, or on SLAs. Once allocated, the BS 11 forms a beam to the SS 10 to maximize signal-to-interference ratios. Once the beam is formed, the BS 11 may allocate the same CDMA channel to one or more other SSs 10 in the cell. It is theoretically possible for the spectral efficiency of the cell to scale linearly with the number of antennas in the BS array 11A.

SDMA greatly favors the approach of fast circuit-switching over pure, TDM packet-switching in a CDMA environment. By fast circuit-switching, what is implied is that packet data services are handled using dedicated connections, which are allocated and terminated based on bandwidth requirements and/or SLAs. An important consideration when providing effective packet-services using this approach lies in the ability of the BS 11 to rapidly determine bandwidth needs, and to both allocate and terminate connections rapidly. With fast channel allocation and termination, SDMA combined with the low frequency reuse offered by S-CDMA is a preferred option, in terms of spectral efficiency, for FWA applications.

A discussion is now made of waveform specifications. The waveform includes the channel coding 22, scrambling 24, modulation 26 and pulse shaping and equalization functions 28 of the air interface, as depicted in FIG. 2. Also included are waveform control functions, including power and timing control. In the presently preferred PHY, each CDMA channel (i.e. spreading code) uses a common waveform, with the spreading factor dictating the data rate of the channel.

With regard to the Error Control Coding (ECC) function 22 of FIG. 2, the ECC is preferably high-rate and adaptive. High rate codes are used to maximize the spectral efficiency of BWA systems using S-CDMA systems that are code-limited. In code-limited systems, the capacity is limited by the code set cardinality rather than the level of the multi-user interference. Adaptive coding is preferred in order to improve performance in multipath fading environments. For the coding options, and referring as well to FIG. 3, the baseline code is preferably a punctured convolutional code (CC). The constituent code may be the industry standard, rate 1/2, constraint length 7 code with generator $(\mathbf{133/171})_8$. Puncturing is used to increase the rate of the code, with rates of 3/4, 4/5, 5/6 or 7/8 supported using optimum free distance puncturing patterns. The puncturing rate of the code may be adaptive to mitigate fading conditions. For decoding (block 38 of FIG. 2), a Viterbi decoder is preferred. Reference in this regard can be made again to the above-noted publication R. De Gaudenzi and F. Gianneti, Analysis and Performance Evaluation of Synchronous Trellis-Coded CDMA for Satellite Applications, IEEE Transactions on Communications, Vol. 43, No. 2/3/4, February/March/April 1995, pp. 1400–1409, for an analysis of trellis-coded S-CDMA.

Turbo coding, including block turbo codes and traditional parallel and serial concatenated convolutional codes, are preferably supported as an option at the rates suggested above. In FIG. 3, the CC/Turbo coding is performed in block 22A, the puncturing in block 22B, and the scrambling can be performed using an XOR 24A that receives a randomizing code.

Each CDMA channel is preferably coded independently. Independent coding of CDMA channels furthers the symmetry of the upstream and downstream waveform and enables a similar time-slot structure on each CDMA channel. The upstream and downstream waveform symmetry aids in cost reduction, as the SS 10 and BS 11 baseband hardware can be identical. The independent coding of each S-CDMA/FDMA channel is an important distinction between this approach and other multi-carrier CDMA schemes.

Randomization is preferably implemented on the coded bit stream. Rather than using a traditional randomizing circuit, it is preferred, as shown in FIG. 3, to use randomizing codes derived from the spreading sequences used by the transmitting station. Using the spreading codes allows different randomizing sequences to be used by different users, providing more robust randomization and eliminating problems with inter-user correlated data due to periodic sequences transmitted (e.g. preambles). Since the receiving station has knowledge of the spreading codes, de-randomization is trivial. Randomization may be disabled on a per channel or per symbol basis. FIG. 3 thus depicts the preferred channel coding and scrambling method for a single CDMA channel.

With regard to the modulation block 26, both coherent QPSK and square 16-QAM modulation formats are preferably supported, with optional support for square 64-QAM. Using a binary channel coding technique, Gray-mapping is used for constellation bit-labeling to achieve optimum decoded performance. This combined coding and modulation scheme allows simple Viterbi decoding hardware designed for binary codes to be used. Differential detection for all modulation formats may be supported as an option. Depending on the channel coding, waveform spectral efficiencies from 1 to 6 information bits/symbol are realized.

The modulation format utilized is preferably adaptive based on the channel conditions and bandwidth requirements. Both upstream and downstream links are achievable using QPSK waveform provided adequate SNR. In environments with higher SNR, the upstream and downstream links may utilize 16-QAM and/or 64-QAM modulation formats for increased capacity and spectral efficiency. The allowable modulation format depends on the channel conditions and the channel coding being employed on the link.

In the preferred embodiment, end-to-end raised-cosine Nyquist pulse shaping is applied by block 28 of FIG. 2, using a minimum roll-off factor of 0.25. Pulse shape filtering is designed to meet relevant spectral masks, mitigate inter-symbol interference (ISI) and adjacent FDMA channel interference.

To mitigate multipath fading, a linear equalizer 32 is preferred for the downstream. Equalizer training may be accomplished using a preamble, with decision-direction used following initial training. With S-CDMA, equalizing the aggregate signal in the downlink effectively equalizes all CDMA channels. Multipath delay spread of less than 3 $\mu$s is expected for Non-Line Of Sight (NLOS) deployments using narrow-beam (10–20°) subscriber station 10 antennas (see, for example, J. Porter and J. Thweat, Microwave Propagation Characteristics in the MMDS Frequency Band, Proceedings of IEEE International Conf. On Communications (ICC) 2000, New Orleans, La., USA, June 2000, and V. Erceg, et al, A Model for the Multipath Delay Profile of Fixed Wireless Channels, IEEE Journal on Selected Areas in Communications (JSAC), Vol. 17, No. 3, March 1999, pp. 399–410.

The low delay spread allows simple, linear equalizers with 8–16 taps that effectively equalize most channels. For the upstream, pre-equalization may be used as an option, but requires feedback from the subscriber station 10 due to frequency division duplexing.

Timing control is required for S-CDMA. In the downstream, timing control is trivial. However, in the upstream timing control is under the direction of the BS 11.

Timing control results in reduced in-cell interference levels. While infinite in-cell signal to interference ratios are theoretically possible, timing errors and reduction in code-orthogonality from pulse shape filtering allows realistic signal to in-cell interference ratios from 30–40 dB. In asynchronous DS-CDMA (A-CDMA) systems, higher in-cell interference levels exist, less out-of-cell interference can be tolerated and higher frequency reuse is needed to mitigate out-of-cell interference (see, for example, T. Rappaport, Wireless Communications: Principles and Practice, Prentice-Hall PTR, Upper Saddle River, N.J., 1996, pp. 425–431. The ability of timing-control to limit in-cell interference is an important aspect of achieving a frequency reuse of one in a S-CDMA system.

Power control is also required for S-CDMA systems. Power control acts to mitigate in-cell and out-of-cell interference while also ensuring appropriate signal levels at the SS 10 or the BS 11 to meet bit error rate (BER) requirements. For a SS 10 close to the BS 11, less transmitted power is required, while for a distant SS 10, more transmit power is required in both the up and downstream. As with timing control, power control is an important aspect of achieving a frequency reuse of one.

Turning now to a discussion of capacity, spectral efficiency and data rates, for a single, spread FDMA channel, the presently preferred S-CDMA waveform is capable of providing channel bandwidths from 1 to 16 Mbps. Using variable-length spreading codes, each CDMA channel can be configured to operate from 32 kbps (SF=128) to 16 Mbps (SF=1), with rates depending on the modulation, coding and RF channel bandwidths. With S-CDMA channel aggregation, high data rates are possible without requiring a SF of one. In general, the use of S-CDMA along with the presently preferred interference mitigation techniques enable the system to be code-limited. Note, mobile cellular A-CDMA systems are always interference-limited, resulting in lower spectral efficiency. Recall also that in code-limited systems, the capacity is limited by the code set cardinality rather than the level of the multi-user interference. In a code-limited environment, the communications channel bandwidth of the system is equal to the communications channel bandwidth of the waveform, assuming a SF of one. In the Table shown in FIG. 4 sample parameters are shown for a hypothetical system using different coded modulation schemes and assuming a code-limited DS-CDMA environment. The Table of FIG. 4 illustrates potential performance assuming a single 3.5 MHz channel in both the upstream and downstream. The numbers reported apply to both the upstream and downstream directions, meaning that upwards of 24 Mbps full duplex is possible (12 Mbps upstream and 12 Mbps downstream). With additional FDMA RF channels or large RF channels (e.g. 6 MHz), additional communication bandwidth is possible with the same modulation factors from the Table. As an example, allocation of 14 MHz could be serviced using 4 FDMA RF channels with the parameters described in the Table of FIG. 4. At 14 MHz, peak data rates to a given SS 10 of up to 48 Mbps are achievable, with per-CDMA channel data rates scaling up from 32 kbps. The channel aggregation method in accordance with these teachings is very flexible in servicing symmetric versus asymmetric traffic, as well as for providing reserved bandwidth for QoS and SLA support.

With regard to multi-cell performance, to this point both the capacity and spectral efficiency have been discussed in the context of a single, isolated cell. In a multicell deployment, S-CDMA enables a true frequency reuse of one. With S-CDMA, there is no need for frequency planning, and spectral efficiency is maximized. With a frequency reuse of one, the total system spectral efficiency is equal to the modulation factor of a given cell. Comparing S-CDMA to a single carrier TDMA approach, with a typical frequency reuse of 4, TDMA systems must achieve much higher modulation factors in order to compete in terms of overall system spectral efficiency. Assuming no sectorization and a frequency reuse of one, S-CDMA systems can achieve system spectral efficiencies from 1 to 6 bps/Hz, with improvements being possible with SDMA.

While frequency reuse of one is theoretically possible for DS-CDMA, the true allowable reuse of a specific deployment is dependent on the propagation environment (path loss) and user distribution. For mobile cellular systems, it has been shown that realistic reuse factors range from 0.3 up to 0.7 for A-CDMA: factors that are still much higher than for TDMA systems. In a S-CDMA system, in-cell interference is mitigated by the orthogonal nature of the S-CDMA, implying that the dominant interference results from adjacent cells. For the fixed environments using S-CDMA, true frequency reuse of one can be achieved for most deployments using directional SS 10 antennas and up and downstream power control to mitigate levels of adjacent cell interference. In a S-CDMA environment, true frequency reuse of one implies that a cell is code-limited, even in the presence of adjacent cell interference.

For sectorized deployments with S-CDMA, a frequency reuse of two is preferred to mitigate the interference contributed by users on sector boundaries. In light of this reuse issue, it is preferred, but not required, to use SDMA with adaptive beamforming, rather than sectorization, to improve cell capacity. Since spectral efficiency translates directly into cost, the possibility of a frequency reuse of one is an important consideration.

The use of SDMA in conjunction with S-CDMA offers the ability to dramatically increase system capacity and spectral efficiency. SDMA uses the antenna array 11A at the BS 11 to spatially isolate same code SSs 10 in the cell. The number of times that a code may be reused within the same cell is dependent upon the number of antenna elements in the array 11A, the array geometry, the distribution of users in the cell, the stability of the channel, and the available processing power. Theoretically, in the absence of noise, with an M element antenna array 11A it is possible to reuse each code sequence M times, thereby increasing system capacity by a factor of M. In practice, the code reuse is slightly less than M due to implementation loss, frequency selective multipath fading, and receiver noise. Regardless, significant capacity gains are achievable with SDMA. With appropriate array geometry and careful grouping of users sharing CDMA codes, it is possible to achieve a code reuse of 0.9M or better.

In an actual deployment the number of antenna elements of the antenna array 11A is limited by the available processing power, the physical tower constraints, and system cost (e.g. the number of additional RF front ends (RFFEs)). Selected array sizes vary depending upon the required capacity of the given cell on a cell-by-cell basis. The Table shown in FIG. 5 illustrates the achievable aggregate capacity and modulation factor with typical array sizes, assuming a code reuse equal to the number of antenna elements. The aggregate capacity is defined as the total data rate of the BS 11. Modulation factors exceeding 56 bps/Hz are achievable with 64-QAM and a sixteen-element antenna array 11A. It should be noted that while SDMA increases the capacity of cell, it does not increase the peak data rate to a given SS 10.

The PHY system disclosed herein is very flexible. Using narrowband S-CDMA channels, the PHY system can adapt to frequency allocation, easily handling noncontiguous frequency allocations. The data multiplexing scheme allows great flexibility in servicing traffic asymmetry and support of traffic patterns created by higher-layer protocols such as TCP.

Deployments using the disclosed PHY are also very scalable. When traffic demands increase, new frequency allocation can be used. This involves adding additional FDMA channels, which may or may not be contiguous with the original allocation. Without additional frequency allocation, cell capacity can be increased using the adaptive antenna array 11A and SDMA.

The high spectral efficiency of the disclosed waveform leads to cost benefits. High spectral efficiency implies less frequency bandwidth is required to provide a certain amount of capacity.

Using a symmetric waveform (i.e., a waveform that is the same in the upstream and downstream directions) is a cost saving feature, allowing the use of common baseband hardware in the SS 10 and the BS 11. The use of CDMA technology also aids in cost reduction, as some CDMA technology developed for mobile cellular applications may be applicable to gain economies of scale.

As a spread spectrum signal, the preferred waveform offers inherent robustness to interference sources. Interference sources are reduced by the spreading factor, which ranges from 1 to 128 (interference suppression of 0 to 21 dB.) At the SS 10, equalization further suppresses narrowband jammers by adaptively placing spectral nulls at the jammer frequency. Additional robustness to interference is achieved by the directionality of the SS antennas, since off-boresight interference sources are attenuated by the antenna pattern in the corresponding direction. At the BS 11, the antenna array 11A used to implement SDMA offers the additional benefit of adaptively steering nulls towards unwanted interference sources.

The presently preferred waveform exhibits several properties that make it robust to channel impairments. The use of spread spectrum makes the waveform robust to frequency selective fading channels through the inherent suppression of inter-chip interference. Further suppression of inter-chip interference is provided by equalization at the SS 10. The waveform is also robust to flat fading channel impairments. The adaptive channel coding provides several dB of coding gain. The antenna array 11A used to implement SDMA also functions as a diversity combiner. Assuming independent fading on each antenna element, diversity gains of M are achieved, where M is equal to the number of antenna elements in the antenna array 11A. Finally, since the S-CDMA system is code-limited rather than interference limited, the system may run with a large amount of fade margin. Even without equalization or diversity, fade margins on the order of 10 dB are possible. Therefore, multipath fades of 10 dB or less do not increase the BER beyond the required level.

The adaptive modulation also provides some robustness to radio impairments. For receivers with larger phase noise, the QPSK modulation offers more tolerance to receiver phase noise and filter group delay. The adaptive equalizer at the SS 10 reduces the impact of linear radio impairments. Finally, the use of clipping to reduce the peak-to-average power ratio of the transmitter signal helps to avoid amplifier saturation, for a given average power output.

An important distinction between the presently preferred embodiment and a number of other CDMA approaches is the use of a synchronous upstream, which allows the frequency reuse of one. Due to some similarity with mobile cellular standards, cost savings are possible using existing, low-cost CDMA components and test equipment.

The presently preferred PHY is quite different from cable modem and xDSL industry standards, as well as existing IEEE 802.11 standards. With a spreading factor of one chip/symbol, the PHY supports a single-carrier QAM waveform similar to DOCSIS 1.1 and IEEE 802.16.1 draft PHY (see Data-Over-Cable Service Interface Specifications: Radio Frequency Interface Specification, SP-RF1v1.1-I05-000714, and IEEE 802.16.1-00/01r4, Air Interface for Fixed Broadband Wireless Access Systems, September 2000.

The presently preferred PHY technique provides an optimum choice for IEEE 802.16A and for other applications. An important aspect of the PHY is its spectral efficiency, as this translates directly to cost measured in cost per line or cost per carried bit for FWA systems. With a frequency reuse of one and efficient support of SDMA for increased spectral efficiency, the combination of S-CDMA with FDMA is an optimum technology for the fixed wireless access market.

Benefits of the presently preferred PHY system include:

High spectral efficiency (1–6 bps/Hz system-wide), even without SDMA;

Compatibility with smart antennas (SDMA), with system-wide spectral efficiency exceeding 20 bps/Hz possible; and A frequency reuse of one is possible (increased spectral efficiency and no frequency planning).

The use of S-CDMA provides robustness to channel impairments (e.g. multipath fading): robustness to co-channel interference (allows frequency reuse of one); and security from eavesdropping.

Also provided is bandwidth flexibility and efficiency support of QoS requirements, flexibility to support any frequency allocation using a combination of narrowband S-CDMA combined with FDMA, while adaptive coding and modulation yield robustness to channel impairments and traffic asymmetries.

The use of these teachings also enables one to leverage mobile cellular technology for reduced cost and rapid technology development and test. Furthermore, cost savings are realized using the symmetric waveform and identical SS 10 and BS (RBU) 11 hardware.

Having thus described the overall PHY system, a more detailed discussion will now be made of an aspect thereof that is particularly pertinent to these teachings. More specifically, a discussion will now be made of the presently preferred CDMA waveform.

The presently preferred waveform uses Direct-Sequence Code Division Multiple Access (DS-CDMA). To provide additional capacity, Frequency Division Multiple Access (FDMA) or Space Division Multiple Access (SDMA) can be employed. With FDMA, each FDMA channel (or RF carrier) uses Code Division Multiplexing (CDM). Up to four, contiguous FDMA channels may be supported per link. With SDMA, each spatial channel uses CDM. SDMA may use fixed spatial channelization (e.g. sectorization) or adaptive spatial channelization, as described above with respect to the use of the multi-element antenna array 11A. Up to four SDMA channels may be supported per link.

In each frequency or spatial channel, the presently preferred waveform uses DS-CDMA. The modulation is direct-sequence spread-spectrum (DS-SS) with a synchronous forward link (BS 11 to SS 10) and a synchronous reverse link (SS10 to BS 11). With DS-CDMA, a single spreading code defines a CDMA channel, with the waveform being capable of supporting multiple CDMA channels. The waveform allows each CDMA channel to operate at multiple data rates using adaptive modulation formats and variable spreading factors.

The waveform supports CDMA channel aggregation in both the forward and reverse link, whereby a CDMA channel group is allocated to a given user or group of users. A CDMA channel group may be constructed from the aggregation of up to 8 CDMA channels. Within each channel group, data is multiplexed across CDMA channels to form a large bandwidth data pipe.

The waveform supports Frequency Division Multiple Access (FDMA), with up to four frequency channels (or carriers) supported per link. DS-CDMA is used within each FDMA channel. The FDMA channel spacing is flexible and spans, in the presently preferred embodiment, a maximum bandwidth of 14 MHz. A typical deployment may use four FDMA channels spaced by 3.5 MHz, spanning the total of 14 MHz of bandwidth.

CDMA channel aggregation is used across FDMA channels. Here, a CDMA channel group may contain CDMA channels in different FDMA channels. As before, a maximum aggregation of eight CDMA channels is supported.

An important motivation for the use of a hybrid CDMA/FDMA is the ability to provide very large peak data rates, without having to increase the chipping rate of the CDMA. As one increases the chipping rate, synchronous CDMA becomes more difficult to implement.

The waveform is also compatible with SDMA using a fixed channelization (e.g. sectorization) or a dynamic channelization. The waveform supports a maximum of four SDMA channels per system. The total number of FDMA and SDMA channels supported by a single system is preferably set at four, although other embodiments may use more or less than this number of FDMS/SDMA channels. In the case of four channels, and by example, a system may support two FDMA channels and two SDMA channels, or four FDMA channels and zero SDMA channels. CDMA channel aggregation is not supported across the spatial channels in the presently preferred embodiment, but this is not a limitation on the practice of this invention, and other embodiments may support the use of CDMA channel aggregation across the spatial channels.

The waveform also supports random access using slotted Aloha on a specified number of CDMA channels. The random access CDMA channels may operate at different data rates and may be distributed across FDMA and/or SDMA channels. The waveform also supports Frequency Division Duplexing (FDD), as was discussed above.

Each CDMA channel operates at coded symbol rates of 21.25, 42.5, 85, 170 and 2720 ksps (thousand symbols per second) in both the forward and reverse link. Each coded symbol stream is modulated using DS-SS with a fixed chipping rate of 2.72 Mcps.

With a 2.72 Mcps chipping rate, the waveform supports a FDMA channelization of 3.5 MHz and 1.75 MHz. The 1.75 MHz channelization is supported using a half-rate spreading code design. The waveform supports a 7, 10.5 and 14 MHz channelization using two, three or four, 3.5 MHz FDMA channels. The waveform also supports a 5 and 6 MHz channelization, using two FDMA channels with bandwidths of 3.5 MHz and 1.75 MHz, respectively.

The waveform supports aggregate information bit rates of 34, 68, 136, 272, 544, 2890 and 5780 kbps (thousand bits per second) per CDMA channel. Of the aggregate information bit rate, 5.9% of the information is overhead while the remaining data is payload. The overhead on each CDMA channel is used for Media Access Control (MAC) control and training. The payload information bit rates are 32,64, 128,256, 512,4096 and 8.192 Mbps per CDMA channel. The maximum payload capacity and peak payload information bit rate per FDMA channel is 8.192 Mbps. Using four FDMA channels, the maximum payload capacity and peak payload information bit rate is 32.768 Mbps.

With a single FDMA channel, CDMA channel groups may contain up to eight CDMA channels, with each CDMA channel operating at symbols rates of 21.25, 42.5, 85 or 170 ksps. The rates of the individual CDMA channels within a CDMA channel group need not be the same. Using a FDMA channel, the use of the 2.27 Msps CDMA channel implies that no other CDMA channels maybe used within the FDMA channel. Operation with a symbol rate of 2.72 Msps is referred to as "clear mode", denoting that no spreading is performed (e.g. one chip per symbol).

With multiple FDMA channels, a CDMA channel group may contain CDMA channels from different FDMA channels. The clear-mode CDMA channel may also be part of this group.

The waveform uses dynamic data rates, whereby the rate of any CDMA channel or CDMA channel group may change during a connection. Dynamic rate changing is independent in the forward and reverse links and may vary from user-to-user for multi-user systems. Dynamic rate changing occurs on the 16 ms frame boundaries (see below for details of the CDMA channel frame structure).

Figure 6B:
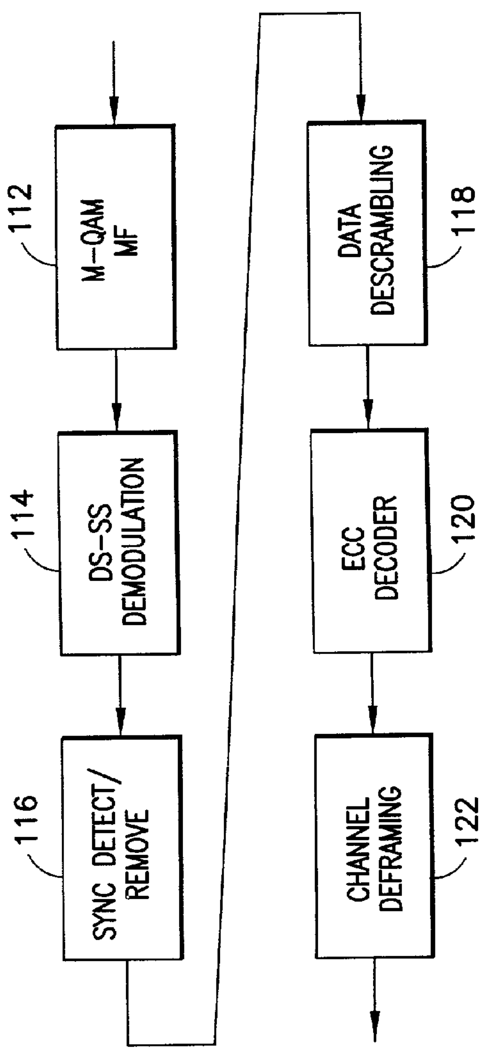
FIG. 6B is a block diagram of a CDMA channel baseband receive chain.

What follows now is a discussion of the details of the CDMA channels, describing the channel framing, Error Control Coding (ECC), modulation and data scrambling. In FIGS. 6A and 6B the CDMA channel baseband transmit and receive chains are shown.

In FIG. 6A the CDMA channel baseband transmit chain includes a channel framing block 100, an ECC encoding block 102, a data scrambling block 104, a SYNC insertion block 106, a QAM bit-to-symbol mapping block 108, and a DS-SS modulation block 110. In FIG. 6B the CDMA channel baseband receive chain includes a M-QAM Matched Filter block 112, a DS-SS demodulator 114, a SYNC detect and removal block 116, a data descrambling block 118, an ECC decoder 120 and a channel deframing block 122.

For the presently preferred CDMA waveform, each CDMA channel is framed using the 16 ms frame format. In accordance with an aspect of these teachings, the waveform supports the following three frame formats: normal, termination and backward compatible (i.e., legacy). The termination frame format is used when a CDMA channel is terminated or "turned off". The backward compatible frame format is used when communicating with legacy equipment. The normal frame format is used in all other cases.

All frame formats define a 16 ms frame with a generic structure that includes data, control and training fields. The data fields carry the payload information. The control fields carry link control information required by the MAC. The training symbols carry information needed for frame synchronization, carrier and AGC training and ECC termination.

The frame format is defined on the aggregate coded bit stream. Here, the data and control fields are always ECC encoded and scrambled. The training field is encoded only in the termination frame format. In the preferred embodiment the symbols in the training field are never scrambled.

Figure 7:
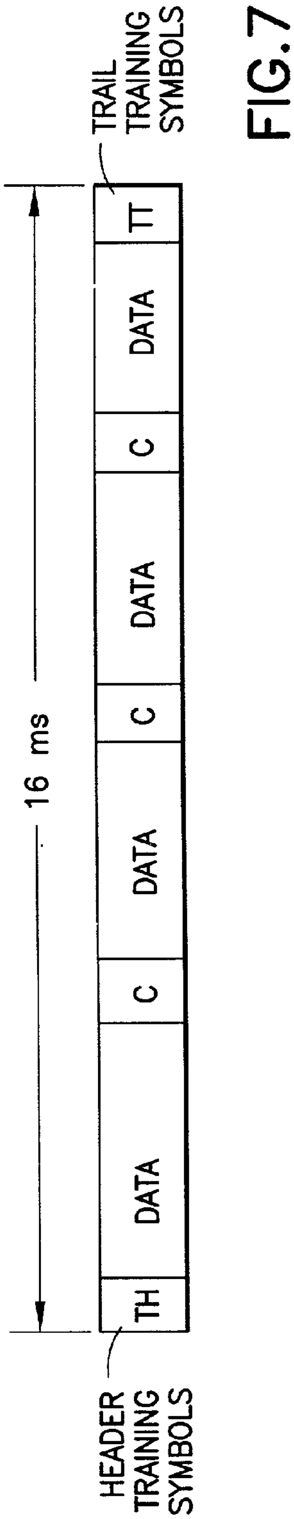
FIG. 7 shows a presently preferred physical layer frame format.

In FIG. 7 the format of a basic 16 millisecond frame 200 is shown. Four equal-size data fields are defined, each representing 23.5% of the frame duration. The data fields (DATA) consume a total of 94.1% of the frame duration. Three, equal-sized control fields (C) are defined, each representing 1.47% of the frame duration. Two training fields are defined (TH and TT). The header-training field (TH) represents 1.18% of the frame time. The tail-training field (TT) represents 1.76% of the frame time. The control and training thus represent 5.88% of the frame and constitute the overhead portion of the frame.

The percentages of data, control and training within a CDMA channel are fixed for all supported symbol rates. The Table shown in FIG. 9 details the data, control and training fields for the different symbol rates and modulation schemes supported by the waveform.

The definition of the training fields differentiates the three frame formats. For the normal frame format, both the header and tail training fields are fixed for each frame (e.g., not ECC encoded) based on the modulation scheme (e.g., 4-QAM or 16-QAM). The header and tail training fields are used for frame synchronization, as well as for equalizer and AGC training.

Defined for use by the CDMA waveform is a two-symbol header-training sequence h and a three-symbol tail-training sequence t. Here, the symbols may be 4-QAM or 16-QAM. Using these base-training sequences, the header and tail training sequence fields are defined at the different rates as shown in the Table of FIG. 8B. As the table shows, the base sequences h and t are simply repeated at the higher symbol rates. Furthermore, h and t may be different for 16-QAM and 4-QAM modulation.

When a CDMA channel is turned off, the last frame prior to turn-off uses the termination frame format. The purpose of the termination frame format is to give the ECC decoder sufficient information to finish decoding without inducing bit errors. For voice calls, errors at termination are of little consequence. However, in packet-data systems proper channel termination is required for rate changing, and errors are to be avoided.

In the termination frame format shown in FIG. 8C, the header training field is the same as in the normal frame format (see the Table of FIG. 8B). However, some or the entire tail-training field may be generated by the ECC encoder 102. At a symbol rate of 21.25 ksps and 42.5 ksps, the entire tail-training sequence (3 or 6 symbols) is produced by the ECC. At symbol rates above 42.25 ksps, the first 6 symbols of the tail-training sequence are produced by the ECC, and the remaining symbols are the same as for the normal frame format. In FIG. 8C the header and tail training fields are shown for the termination frame format. Here, h is the two-symbol header-training sequence and t is the three-symbol tail-training sequence as defined in the normal frame format. The three symbol sequence v is generated by the ECC encoder 102 and depends on the final state of the encoder.

As an example, assume a case of channel aggregation wherein a user is operating with a 96 kbps link implemented with a 32 kbps link on a first channel and a 64 kbps link on a second channel. Assume also that the user is to be given a single channel of 128 kbps. In this case it will be pre-agreed by signaling between the BS 11 and the SS 10 that the SS 10 will stop transmitting on one of the current channels (e.g., the 32 kbps channel) after some number of frames, thereby terminating the use of this channel, and will continue operating on the other channel, but at the higher bit rate of 128 kbps. When transmitting the last frame on the 32 kbps channel the SS 10 will transmit not a normal traffic frame, but the termination frame wherein at least some of the TT symbols are generated by the ECC encoding block 102. The BS 11 expects to receive the termination frame instead of the normal frame, and thus interprets the TT symbols accordingly.

Note should be made that it is not required that the receiving node have a priori knowledge of whether a normal frame or a termination frame is being received. Instead, by examining the TT field the receiver can determine if training information is present. If it is, then the frame is a normal frame, and if it is not, then the frame is most likely a termination frame (or some other frame type known to both the transmitter and the receiver).

The legacy frame format is used only when communicating with legacy waveform, such as a 32 kbps CDMA channel with 4-QAM modulation. Reference in regard to one suitable legacy system can be had in the above-referenced U.S. Pat. No. 5,966,373, which is incorporated by reference herein in its entirety. The legacy frame format differs from the normal and termination frame formats in several ways. First, the definition of the Training Header (TH) and Tail fields (TT) is different. Here, the 2-symbol training header is referred to as the SYNC END (SE) and the 3-symbol training tail field is the SYNC START (SS). For backward compatibility, the SE and SS fields are SE=[1+j, −1−j, −1+j] and SS=[1+j, 1−j], where the 4-QAM symbols are of the form s=I+j Q.

In the frame format defined in U.S. Pat. No. 5,966,373 there is a 48 ms superframe structure, where a superframe is composed of three, 16 ms frames. The superframe is delimited by inverting the SS and SE fields. Therefore, the legacy frame format supports the inversion of SS and SE every third frame.

Figure 9A:
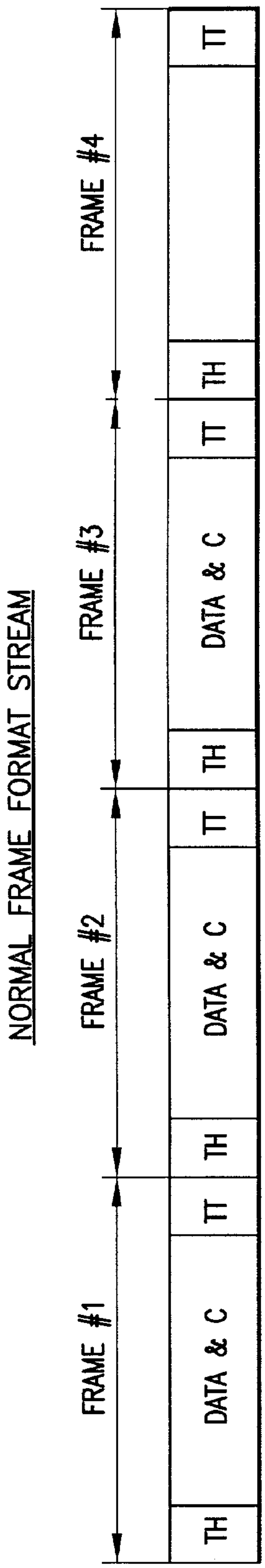
FIG. 9A shows the normal frame format stream.
Figure 9B:
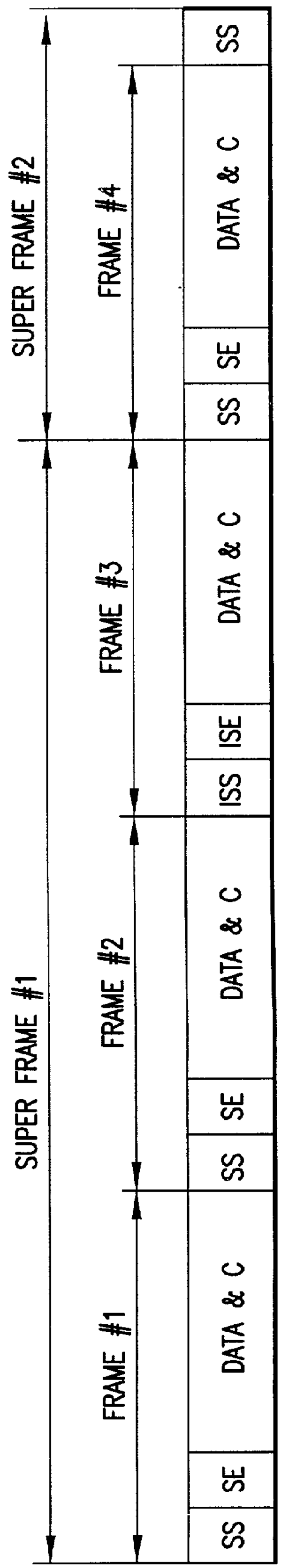
FIG. 9B shows the normal and legacy frame formats.

In FIGS. 9A and 9B there is shown the structure for normal/termination and legacy frame formats and the associated frame boundaries. Note that the frame boundaries are shifted for the legacy frame format by three symbols at the 21.25 ksps rate. The superframe structure can be observed in future frame formats, with the inverted SS and SE fields located every third frame.

While the legacy frame format adjusts the frame boundary, the transmitter turn-on and turn-off are coordinated on frame boundaries for the normal frame format. For a channel turn-on, the transmitter begins transmitting on the SE field rather than the SS field in the legacy frame format. For a channel turn-off, the transmitter stops transmitting at the end of the last DATA field.

The waveform supports both 4-QAM (e.g., Quaternary Phase Shift Keying (QPSK)) and 16-QAM. The spectral format of both modulation schemes is:

$$s(t)=I(t)\cos(wt)-jQ(t)\sin(wt),$$

where t denotes time and w denotes angular frequency.

The waveform supports 4-QAM and 16-QAM symbol rates of 21.25, 42.5, 85, 170 and 2720 ksps on each CDMA channel.

Two coded bits, $d_1$ (MSB) and $d_0$ (LSB), are carried on each 4-QAM symbol. The waveform may use any constellation mapping. However, Gray mapping as shown in FIG. 1A is preferred for the 4-QAM. The synthesis equations for this constellation mapping are shown in FIG. 10A.

In the synthesis equations, A is a function of the symbol rate and determines the transmitted energy per symbol. The transmitted energy per 4-QAM symbol, assuming equal-probability input bits, is $E_s=2A^2/T_s$, where $T_s$ is the symbol duration in seconds.

Four coded bits, $d_3$ (MSB), $d_2$, $d_1$, and $d_0$ (LSB), are carried on each 16-QAM symbol. The waveform supports arbitrary constellation mappings. However, the constellation mapping shown in FIG. 11B is preferred. The synthesis equations for this constellation mapping are shown in FIG. 10B.

In the synthesis equations, the MSBs ($d_3$ and $d_2$) determine the respective sign of I and Q, while the LSBs ($d_0$ and $d_1$) determine the magnitude (e.g., A or 3A). The spacing parameter A is a function of the symbol rate and determines the transmitted energy per symbol. The transmitted energy per 16-QAM symbol, assuming equal-probability input bits is $E_s=10A^2/T_s$, where $T_s$ is the symbol duration in seconds.

Using rate 4/5 error control coding, the waveform spectral efficiency, measured as information bits per coded symbol, for 4-QAM is 1.6 bits/symbol. The waveform spectral efficiency of 16-QAM is 3.2 bits/symbol. When contained in 3.5 MHz of spectrum, the spectral efficiency, measured as information bits per second per Hz of used bandwidth, is 1.17 bps/Hz. The spectral efficiency of 16-QAM is 2.34 bps/Hz.

In that both modulation formats are required to operate at different symbol rates, the presently preferred CDMA waveform provides a mechanism to equalize the transmitted energy. Energy equalization is important to ensure balanced links, whereby the performance, measured in terms of bit error rate (BER) or signal-to-noise ratio (SNR), is equal over all modulation formats and all symbol rates. Energy equalization is accomplished by using an appropriate constellation spacing parameter (A). For equalization, the waveform may equalize the energy per information bit across modulation schemes and symbol rates. For 4-QAM, the energy per information bits is $E_b=(2/1.6)A^2/T_s$. For 16-QAM, the energy per transmitted information bit is $E_b=(10/3.2)A^2/T_s$. The energy equalization is preferably within 0.5 dB.

In the Table of FIG. 12A there is shown the appropriate, floating-point spacing parameters for the different modulation formats and different symbol rates. Here, AO is chosen for the lowest symbol rate (21.25 ksps) and 4-QAM.

The waveform does not, however, preclude the transmission of equal energy per symbol, rather than equal energy per information bit. For equal energy per symbol, 4-QAM and 16-QAM use the values from the Table shown in FIG. 12B. Again, $A_0$ corresponds to the spacing parameter for 4-QAM at the lowest symbol rate of 21.25 ksps. Different values may be employed if operating with 64-QAM (or some other modulation format).

Each M-QAM complex symbol stream is modulated in modulation block 112 using DS-SS with a fixed chipping rate of 2.72 Mcps. Both the in-phase (I) and quadrature (Q) components of the M-QAM stream are spread using the same spreading code. To support different symbol rates, the DS-SS supports variable Spreading Factors (SF), where the SF is defined as the number of chips per complex coded symbol. The Table shown in FIG. 13 illustrates the SF and corresponding symbol rates supported by the waveform.

Reference with regard to variable rate CDMA can be made to commonly assigned U.S. Pat. No. 6,091,760, Non-Recursively Generated Orthogonal PN Codes for Variable Rate CDMA, by T. R. Giallorenzi et al., issued Jul. 18, 2000, incorporated by reference herein in its entirety.

The waveform also supports the use of variable-rate, orthogonal spreading codes. For a given FDMA channel, the spreading code set is constructed as follows. The construction begins with a 16×16 Hadamard matrix (H). Using row/column permutations and row inversions (e.g. multiplication by −1) of H, three 16×16 base code sub-matrices ($H_1$, $H_2$ and $H_3$) are formed. These three 16×16 matrices are concatenated to form a 16×48 base code matrix $C=[H_1|H_2|H_3]$. Next, an 8×8 modulation matrix M is constructed.

Figure 14A:
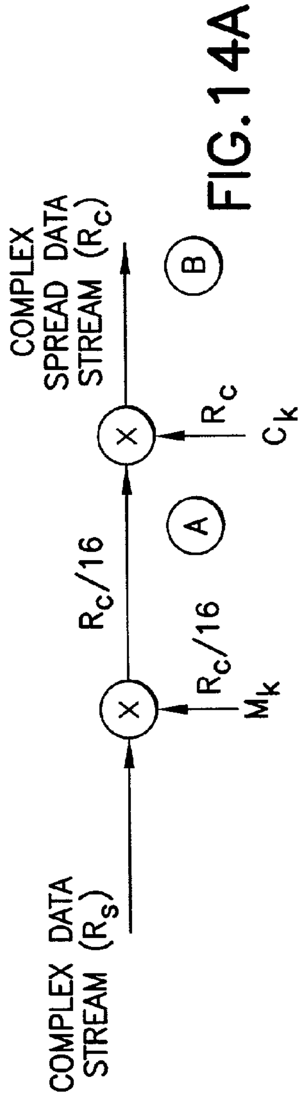

The construction of the modulation matrix allows for the variable rate operation of the spreading codes. For spreading, the waveform uses a heterodyne (or two-stage) spreading technique as shown in FIG. 14A. Here, a 1×8 row of the modulation matrix, referred to as a modulation spreading vector (MSV), is chosen to perform spreading at a rate or $R_c/16$. Following the outer spreading, a 1×48 row of the base code matrix, termed a base code-spreading vector (BCSV), is chosen to perform spreading at a rate of $R_c$. For continuous spreading, the modulation spreading vector and the base code spreading vectors are repeated in a cyclic fashion.

Figure 14B:
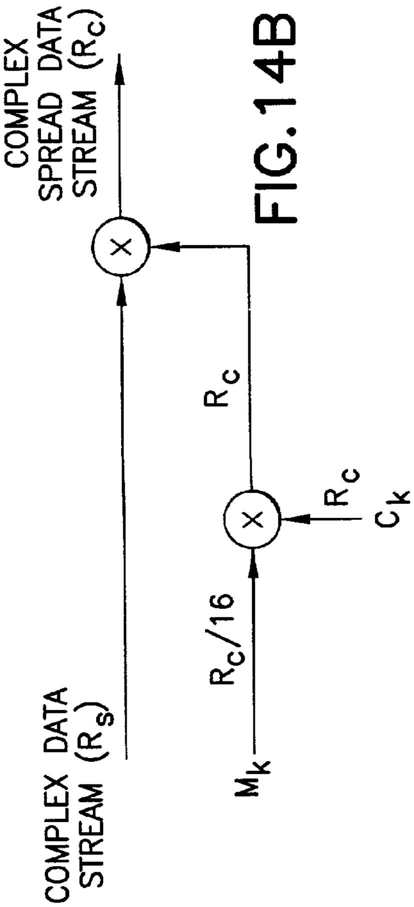
FIG. 14B illustrates an alternative, presently preferred circuit diagram for accomplishing heterodyne spreading.

In FIG. 14 it can be seen that the complex data stream at point A has been spread with a spread factor of 1, 2, 4 or 8 chips per symbol, depending on the input symbol rate ($R_s$). At point B, the complex data stream has been spread with a spread factor of 1, 16, 32, 64 or 128 chips per symbol, again depending on the input symbol rate ($R_s$). It should be recalled that the input symbol rate $R_s$ can take on values of $R_c$, $R_c/16$, $R_c/32$, $R_c/64$ and $R_c/128$. Another alternative way to view heterodyne spreading, and one representing a presently preferred embodiment, is shown in FIG. 14B. Here, each element of the MSV is spread using 16 chips from the BCSV to form an aggregate spreading sequence. The aggregate spreading sequence then spreads the complex data stream.

The waveform supports spreading code hopping, whereby the spreading code assignments change on a symbol-by-symbol basis in a coordinated manner.

The waveform also supports variable RF channelizations per FDMA channel using intelligent PN code design. Here, the base code matrix is constructed such that the RF bandwidth required for transmission is $R_c/2$, $R_c/4$ or $R_c/8$. The goal is that for a given chip rate $R_c$, repeating chips N times results in an effective chipping rate of $R_c/N$ and thus a lower RF bandwidth signal. With a fixed chipping rate, designing the spreading codes properly allows reduced RF bandwidth, but with reduced capacity. In this scheme, while the required RF bandwidth goes down by 1/N, so does the capacity of the FDMA channel. Reduced RF bandwidth spreading involves a simple modification to the code construction procedure, along with intelligent spreading code allocation. As can be appreciated, the RF bandwidth decreases as the chip repetition factor increases.

A mixed system can also be implemented whereby, for example, a 5 MHz channel is serviced using a single FDMA band with N=1 and RF bandwidth of 3.5 MHz, along with a second FDMA band with N=4 and RF bandwidth of 0.875 MHz. The capacity of the 5 MHz system is thus 10.24 Mbps.

The waveform preferably uses, but is not limited to, rate 4/5 convolutional coding for all modulation formats and symbol rates. The rate 4/5 convolutional coding is constructed from a rate 1/2, 64-state feed-forward convolutional coder (CC) with generator $133_8/171_8$ (ECC coder 102 of FIG. 6A.) The output of the CC is punctured to rate 4/5 using an optimum free distance puncturing scheme. The punctured encoding circuit 102A shown in FIG. 15, wherein the binary input u is encoded using a rate 1/2 CC 103A to produce a coded bit pair $(s_1,s_0)$. The coded bits are punctured and mapped in puncture block 103B to form a punctured bit pair $(a_1,a_0)$.

Figures 15, 16, 17:
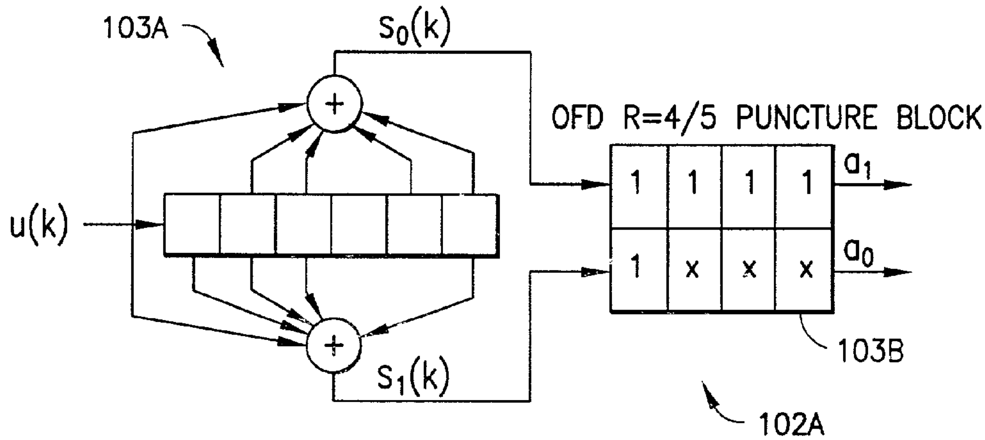
FIG. 15 is a circuit diagram of an encoder for the QPSK code modulation technique.
FIG. 16 illustrates a punctured bit pair ($a_1$, $a_0$)
FIG. 17 shows a coded bitmap for the 16-QAM waveform.

For QPSK (4-QAM) modulation, the punctured bit pairs $(a_1,a_0)$ shown in FIG. 16 map directly to an I/Q symbol pair with $d_1=a_1$ and $d_0=a_0$ for the synthesis equations shown in FIG. 10A. For 16-QAM modulation, two punctured bit pairs are collected to form the binary 4-tuple $(d_3, d_2, d_1, d_0)$, as shown in FIG. 17. As can be seen, the first bit pair $(a_1(k), a_0(k))$ forms the MSBs of the 4-tuple (e.g. $d_3$ and $d_2$), while the next bit pair $(a_1(k+1),a_0(k+1))$ forms the LSBs in the 4-tuple (e.g. $d_1$ and $d_0$).

Figure 18:
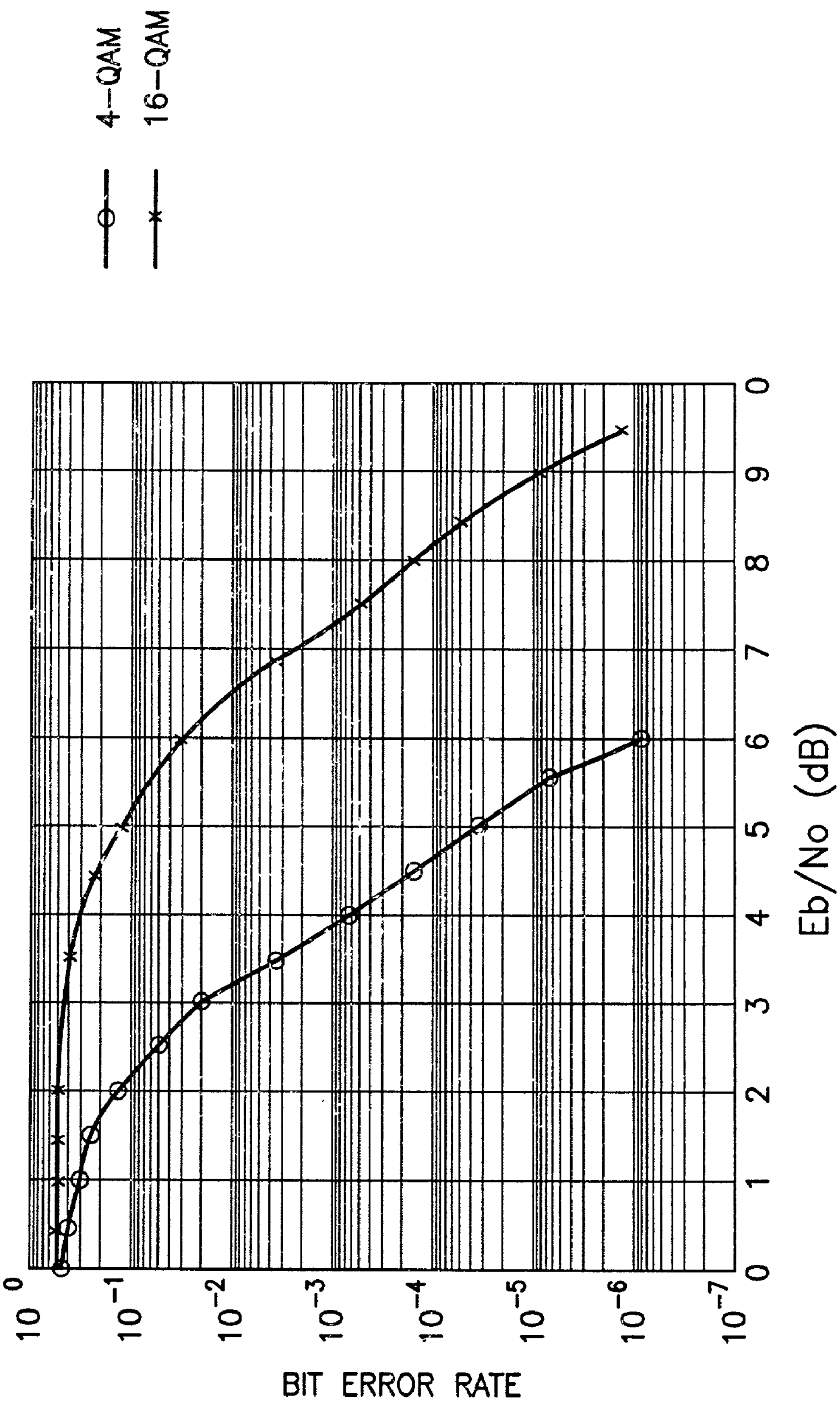
FIG. 18 is a graph showing a theoretical BER for a coded modulation scheme on an AWGN channel.

A simulation of the performance of the presently preferred coded modulation scheme is shown in FIG. 18, and assumes an AWGN channel and optimum Viterbi decoding. The Table of FIG. 19 shows the minimum Eb/No values for the different modulation formats and different bit error rates.

It should ne noted that the presently preferred CDMA waveform does not preclude the use of other fractional rate ECC designs, including turbo codes. The variants of turbo codes that are suitable for use include, but are not limited to, parallel-concatenated convolutional codes (PCCC), serial-concatenated convolutional codes (SCCC), block turbo codes (e.g. product codes with iterative decoding) and turbo trellis coded modulation.

Amplitude limiting or clipping may be used in conjunction with the presently preferred embodiment of the waveform. Clipping limits the peak-to-average power ratio (PAR) at the expense of distortion. The waveform PAR preferably does not exceed 12 dB while maintaining a signal-to-noise ratio, due to clipping distortion, of greater than 25 dB.

For spectral containment, the waveform use square root-raised cosine pulse shape with an excess-bandwidth factor between about 0.25 and 0.5.

The waveform is intended for operation in fixed wireless access systems operating in the 2 to 11 GHz range, although the use of the presently preferred CDMA waveform is not limited to only this one RF spectral band.

While described in the context of a S-CDMA system, it should be appreciated that certain aspects of these teachings have applicability as well to other types of wireless communication systems such as, for example, TDMA and FDMA systems. Furthermore, these teachings need not be limited to synchronous wireless systems, as asynchronous wireless systems may benefit as well from their use. Furthermore, while described in the context of various exemplary modulation and channel coding formats, frequencies, spreading factors, symbol rates and the like, it should be realized that these are exemplary, and are not to be construed in a limiting sense upon the practice of this invention.

Thus, while these teachings have been particularly shown and described with respect to preferred embodiments thereof, it will be understood by those skilled in the art that changes in form and details may be made therein without departing from the scope and spirit of the invention described above.

What is claimed is:

1. A method for operating a wireless communications system, comprising:

transmitting a waveform, the waveform comprising a plurality of repeating frames each comprising x header training base symbols in a header training symbol field (TH) and y tail training base symbols in a tail training symbol field (TT); and receiving a frame; where the received frame functions as one of a plurality of different types of frames depending on the content of at least TT wherein a frame function as one of a normal traffic frame and a termination frame, wherein the step of receiving includes a step identifying the frame as to a type of frame by examining at least the content of TT, and wherein for the case of the repeating frames being of the normal frame type, the contents of the THs and of the TTs is the same across the repeating normal frames, the normal frame THs and TTs are not error correction encoded, and the normal frame THs and TTs are used by receiver circuitry at least for one of frame synchronization, equalizer training and AGC training purposes.

2. A method as in claim 1, wherein a frame functions as one of a normal traffic frame, a termination frame, or a legacy frame providing backwards compatibility with another waveform.

3. A method as in claim 1, wherein x=2 and y=3.

4. A method as in claim 1, wherein the frame comprises four equal-size data fields separated by three equal-sized control fields, the header training symbol field (TH) and the tail training symbol field (TT).

5. A method as in claim 4, wherein a percentage of the total frame occupied by each of the data, control, TH and TT fields remains constant for each symbol rate supported by the waveform, and where the TH and TT base symbol sequences are repeated at higher symbol rates.

6. A method as in claim 1, wherein for the normal frame the content of both the header and tail training symbol fields is the same for each frame and are not error correction encoded, and wherein the TH and TT are used by receiver circuitry at least for one of frame synchronization, equalizer training and AGC training purposes.

7. A method as in claim 6, wherein for the termination frame TH is the same as in the normal frame, and wherein at least a portion of the TT is generated by a channel coder, the size of the portion being determined by the symbol rate.

8. A method as in claim 7, wherein at symbol rates of 21.25 ksps and 42.5 ksps the entire TH is generated by the channel coder, and at symbol rates greater than 42.25 ksps only the beginning symbols of the of the TH are generated by the channel coder, and the remaining symbols are the same as for the normal frame format.

9. A method as in claim 8, wherein state of the beginning symbols of the TT is determined by the final state of the channel coder.

10. A method as in claim 2, wherein in the legacy frame format an initial symbol training header field is referred to as a SYNC END (SE) field, a terminal symbol training tail field is referred to as a SYNC START (SS) field, and to achieve backwards compatibility SE=[1+j, −1−j, −1+j] and SS=[1+j, 1−j], where 4-QAM symbols are of the form s=I+j Q.

11. A method as in claim 10, wherein three consecutive legacy frames form a superframe that is delimited by inverting the SS and SE fields, and wherein the TH and TT fields are inverted every third frame to delimit a legacy superframe.

12. A method as in claim 1, wherein the waveform uses multi-carrier transmission, and supports up to four carriers with aggregation between carriers such that a given user's data can be conveyed simultaneously by more than one carrier.

13. A method as in claim 1, wherein the waveform is a DS-CDMA waveform that uses a fixed chip rate of 2.72 Mcps and variable-length, orthogonal spreading codes constructed from randomized Walsh-Hadamard designs using spread factors of 1, 2, 4, 8, 16, 32, 64, 128, and greater, chips/symbol.

14. A method as in claim 1, wherein the waveform supports 4-QAM and 16-QAM modulation formats with convolutional coding.

15. A method as in claim 2, wherein the waveform supports a 4-QAM modulation format when operating in the legacy mode.

16. A method as in claim 1, wherein the waveform is a DS-CDMA waveform that supports payload data rates of 32, 64, 128, 256, 512, 1024, 2048, 4096, 8192, and greater, kbps per CDMA channel.

17. A method as in claim 1, wherein the waveform is a DS-CDMA waveform that supports aggregation of CDMA channels to support payload data rates of the form n×32 kbps up to 32.768 Mbps in both forward and reverse links.

18. A method as in claim 1, wherein the waveform is a DS-CDMA waveform that supports 4-QAM and 16-QAM with rate 4/5 convolutional coding.

19. A method as in claim 18, wherein the transmitted energy per 4-QAM symbol, assuming equal-probability input bits, is $E_s=2A^2/T_s$, where $T_s$ is the symbol duration in seconds, where A is a constellation spacing factor.

20. A method as in claim 18, wherein the transmitted energy per 16-QAM symbol, assuming equal-probability input bits is $E_s=10A^2/T_s$, where $T_s$ is the symbol duration in seconds, where A is a constellation spacing factor.

21. A method as in claim 18, wherein when using rate 4/5 error control coding, the waveform spectral efficiency, measured as information bits per coded symbol, for 4-QAM is 1.6 bits/symbol, and the waveform spectral efficiency for 16-QAM is 3.2 bits/symbol.

22. A method as in claim 18, wherein both the 4-QAM and 16-QAM operate with symbol rates of 21.25, 42.5, 85, 170 and 2720 ksps on each of a plurality of CDMA channels.

23. A method as in claim 18, and further comprising equalizing energy to equalize performance, measured in terms of at least bit error rate (BER) or signal-to-noise ratio (SNR), over all modulation formats and all symbol rates by using an appropriate constellation spacing parameter (A).

24. A method as in claim 23, wherein the step of equalizing operates so as to transmit equal energy per symbol.

25. A method as in claim 23, wherein the step of equalizing operates so as to transmit equal energy per bit.

26. A DS-CDMA communications system, comprising a node for transmitting a CDMA waveform, the CDMA waveform comprising a plurality of repeating frames each comprising x header training base symbols in a header training symbol field (TH) and y tail training base symbols in a tail training symbol field (TT); and a node for receiving the CDMA waveform, where a received frame is one of a plurality of different types of frames depending on the content of at least TT wherein a frame function as one of a normal traffic frame and a termination frame, wherein the step of receiving includes a step identifying the frame as to a type of frame by examining at least the content of TT, and wherein for the case of the repeating frame being of a normal frame type, the contents of the THs and of the TTs is the same across the repeating normal frames, the normal frame THs and TTs are not error correction encoded, and the normal frame THs and TTs are used by receiver circuitry at least for one of frame synchronization, equalizer training and AGC training purposes.

27. A method as in claim 26, wherein a frame is one of a normal traffic frame, a termination frame, or a legacy frame providing backwards compatibility with another waveform.

28. A method for operating a CDMA communications system, comprising:

- transmitting traffic frames over a CDMA channel, each traffic frame containing coded data and comprising x header training base symbols in a header training symbol field (TH) and y tail training base symbols in a tail training symbol field (TT), the TH and TT field each containing fixed training data for use by a receiver;
- when transmitting a last traffic frame over the CDMA channel, replacing at least a part of the fixed training data in the TT field with data generated by a fractional rate data encoder; and
- receiving the last traffic frame and using, for a data decoder, data from the TT field that was generated by the data encoder.

* * * * *